United States Patent [19]
Kanda et al.

[11] Patent Number: 5,796,450
[45] Date of Patent: Aug. 18, 1998

[54] ILLUMINATION DEVICE AND LIQUID CRYSTAL DISPLAY APPARATUS INCLUDING SAME

[75] Inventors: Toshiyuki Kanda, Chigasaki; Hiroshi Takabayashi, Atsugi; Yoshihiro Onitsuka, Hiratsuka, all of Japan

[73] Assignee: Canon Kabushiki Kaisha, Tokyo, Japan

[21] Appl. No.: 571,545

[22] Filed: Dec. 13, 1995

[30] Foreign Application Priority Data

Dec. 16, 1994 [JP] Japan .................. 6-313693

[51] Int. Cl.⁶ .............................................. G02F 1/1335
[52] U.S. Cl. .................................. 349/64; 349/65
[58] Field of Search .................. 349/62, 64, 65; 362/31, 26

[56] References Cited

U.S. PATENT DOCUMENTS

| | | | |
|---|---|---|---|
| 4,673,254 | 6/1987 | Kato | 349/65 |
| 4,729,068 | 3/1988 | Ohe | 362/26 |
| 5,130,898 | 7/1992 | Akahane | 362/31 |
| 5,207,493 | 5/1993 | Murase et al. | 362/31 |
| 5,357,405 | 10/1994 | Park | 349/65 |
| 5,394,308 | 2/1995 | Watanabe et al. | 349/65 |
| 5,408,388 | 4/1995 | Kobayashi et al. | 362/26 |
| 5,438,484 | 8/1995 | Kanda et al. | 362/31 |
| 5,477,422 | 12/1995 | Hooker et al. | 349/62 |
| 5,664,873 | 9/1997 | Kanda et al. | 349/62 |

FOREIGN PATENT DOCUMENTS

| | | |
|---|---|---|
| 0561329 | 9/1993 | European Pat. Off. |
| 0607453 | 7/1994 | European Pat. Off. |
| 3611174 | 10/1987 | Germany |
| 3910520 | 10/1990 | Germany |
| 6-160642 | 6/1994 | Japan .................. 362/31 |
| 2247309 | 2/1992 | United Kingdom |

Primary Examiner—Anita Pellman Gross
Attorney, Agent, or Firm—Fitzpatrick, Cella, Harper & Scinto

[57] ABSTRACT

An illumination device includes a plurality of linear light sources disposed with a prescribed spacing therebetween, a light guide means disposed between or among the linear light sources, and a reflection means disposed behind the light guide means so that light issued from the linear light sources is transmitted through the light guide means and reflected by the reflection means to be emitted in a direction forward from the light guide means. Further, a luminance distribution-adjusting means for reflecting light transmitted through the light guide means is disposed along the light guide means in a disribuption density which varies continuously at a changing rate free from discontinuity so as to adjust the luminance distribution of the light emitted in the direction forward from the light guide means. The illumination device may be suitably used as a backlight behind a liquid crystal panel to provide a liquid crystal display apparatus having improved display qualities.

17 Claims, 7 Drawing Sheets

ILLUMINATION DEVICE AND LIQUID CRYSTAL DISPLAY APPARATUS INCLUDING SAME

FIELD OF THE INVENTION AND RELATED ART

The present invention relates to an illumination device used, e.g., as a backlight device for illuminating a liquid crystal panel, and a liquid crystal display apparatus including the illumination device, more particularly a planar illumination device improved in uniformity of luminance distribution.

Various proposals have been made regarding a backlight device for illuminating a transmission-type liquid crystal panel, etc., from the back side. As an example thereof, FIG. 1 shows a so-called edge-type planar illumination device having light sources at edges, and FIG. 2 shows a section of a liquid crystal display apparatus including such an illumination device.

Referring to FIG. 1, the illumination device (backlight device) 1 includes four (two pairs of) fluorescent lamps (linear light sources) 2 which are mutually oppositely disposed with a spacing therebetween. Surrounded by the fluorescent lamps 2, a transparent sheet member 3, of, e.g., an acrylic plate, is disposed as a light guide means. Each fluorescent lamp 2 is covered with a fallen or sideway U-shaped reflector 5 as shown in FIG. 2. The reflector 5 is formed of an aluminum sheet, and the inner surface thereof is mirror-finished, e.g., by vapor deposition of silver. Behind the acrylic plate 3 and between the opposing reflectors 5, a rear reflection plate (reflection means) 6 is disposed. The rear reflection plate 6 is formed of an aluminum sheet similarly as the reflector 5, and the inner face thereof is mirror-finished by vapor deposition of silver. On a front side of the acrylic plate 3, a diffusion plate 7 is disposed so as to diffuse light from the acrylic plate 3. Further, before (on a front side (upper side in the figure) of) the diffusion plate 7, a liquid crystal panel P is disposed.

By the way, when such a backlight device 1 is driven to turn on the fluorescent lamps 2 without disposing a diffusive reflection pattern (luminance distribution control means) 9 comprising a large number of dots 10, a major portion of light reflected from the reflection plate 6 is not emitted uniformly toward the liquid crystal panel P, and most light emitted toward the liquid crystal panel P comes from the vicinity of the fluorescent lamps 2, thus failing to realize a uniform luminance.

Accordingly, it has been practiced to dispose a diffusive reflection pattern (luminance distribution adjusting means) 9 comprising a large number of dots 10 formed, e.g., by printing of a white paint on the back side of the acrylic plate 3 as shown in FIG. 3, thereby aiming at luminance uniformization by utilization of random reflection. These dots 10 are formed in a larger size and with a smaller spacing at a central portion of the acrylic plate 3 and in a smaller size and with a larger spacing at positions approaching the edges of the acrylic plate 3 as shown in FIG. 3, wherein a character "SP" represents that the distribution density of the dots 10 is sparse. The planar density distribution has been one represented by iso-(distribution) density curves as shown in FIG. 4, wherein concentric regular iso-density curves are drawn. Further, the density distribution in a section including the oppositely disposed pair of fluorescent lamps 2 has been one represented by a broken line shown in FIG. 8 showing a lowest density in proximity to the fluorescent lamps 2 and a density which increases proportional to a distance from the fluorescent lamps 2. As a result, a larger amount of light is emitted in a fore direction from the acrylic plate 3 at a position with a higher density of the diffusive reflection pattern 9 (or dots 10 thereof) and a smaller amount of light is emitted at a position with a lower density of the diffusive reflection pattern 9. Incidentally, the distribution density shown in FIG. 8 (and also in FIG. 4) represents (or is based on) an areal ratio of a portion occupied with the diffusive reflection pattern 9 in a unit area of the acrylic plate 3. An iso-(distribution) density curve shown in FIG. 4 represents a line (or curved line) connecting points of identical distribution density of the diffusive reflection pattern 9. These also hold true with the other Figures relating to distribution densities of a diffusive reflection pattern and iso-distribution density curves thereof. Further, a diffusive reflection pattern 9 showing concentric diamond-shaped iso-distribution density curves as shown in FIG. 5 has also been known in addition to the one shown in FIG. 4.

As a result, regarding light transmitted through the acrylic plate 3, a portion thereof is totally reflected by the acrylic plate 3, a portion thereof is reflection at random by the diffusive reflection pattern 9, and a further portion thereof is reflected by the rear reflection plate 6, thereby illuminating the liquid crystal panel P.

However, in the above-described illumination device (backlight device) designed to dispose the diffusive reflection dots 10 so as to show a distribution density curve represented by the broken line in FIG. 8 which includes an acute-angular change at a point in the central region, i.e., a distribution density curve which change discontinuously at a point providing a maximum of distribution density of the diffusive reflection pattern, the luminance takes the maximum at the central point and bright lines occur from the point as the center, thereby lowering the display quality of the liquid crystal panel. Particularly, in case where the reflection dots 10 are formed to provide a planar distribution pattern as shown in FIG. 4 including rectangular iso-distribution density lines, bright lines 11 occur along lines connecting corners of the iso-distribution density lines, i.e., along diagonal lines, so as to draw an "x"-shaped pattern as shown in FIG. 6. Further, in case of a planar distribution density pattern as shown in FIG. 5, bright lines 12 occur so as to draw a "+"-shaped pattern as shown in FIG. 7.

In recent years, backlights of a larger size and a higher luminance are being used in accordance with provision of larger-sized and/or color liquid crystal panels, so that the total light flux quantity has to be increased. As a result, the above-mentioned problem has become particularly noticeable.

SUMMARY OF THE INVENTION

An object of the present invention is to provide an illumination device capable of providing a uniform luminance while preventing the occurrence of bright lines.

Another object of the present invention is to provide a liquid crystal display apparatus showing good display qualities by using an illumination device having uniformized luminance.

According to the present invention, there is provided an illumination device, comprising:

a plurality of linear light sources disposed with a prescribed spacing therebetween, a light guide means disposed between or among the linear light sources, a reflection means disposed behind the light guide means so that light issued from the linear light sources is transmitted through the light guide means and reflected by the reflection means to be emitted in a direction forward from the light guide means, and a luminance distribution-adjusting means for reflecting light transmitted through the light guide means disposed along the light guide means in a distribution density which varies continuously at a changing rate free from discontinuity so as to adjust the luminance distribution of the light emitted in the direction forward from the light guide means.

According to another aspect of the present invention, there is provided a liquid crystal display apparatus including an illumination device as described above and a liquid crystal panel disposed in front of the illumination device so as to be illuminated with light from the illumination device to effect a display.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The illumination device according to the present invention is principally characterized by having a plurality of linear light sources disposed so as to laterally surround or sandwich a light guide means (member), and a luminance distribution adjusting means disposed along or in superposition with the light guide means having a distribution density which varies free from discontinuity or without deflection. It is particularly preferred that the distribution density curve spanning between a pair of mutually disposed linear light sources and over a central part of the light guide member forms a continuously charging curve.

Figure 8:
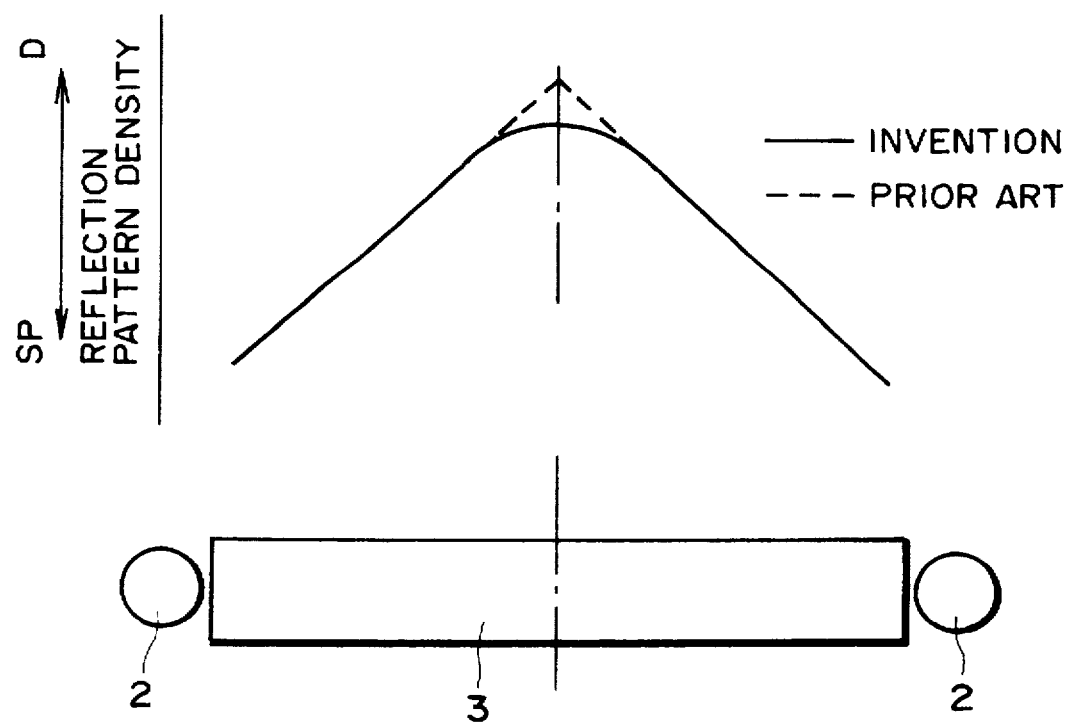
FIG. 8 illustrates diffusive reflection pattern distribution densities along a transverse section between two opposite fluorescent lamps.

More specifically, in the present invention, it is preferred that the luminance distribution-adjusting means is disposed to form a distribution density-changing curve as represented by a solid line in FIG. 8 having a moderate maximum (or minimum) density portion characterized as a region providing a slope (density-changing rate per length along a transverse section) which is at most 50% of a maximum slope along the curve for a length (including the maximum or minimum density portion) of at least 5% of the entire transverse section length of the light guide means (i.e., nearly the transverse length of the illumination device).

Due to the above-described structure, light issued from the linear light sources is transmitted through within the light guide member, and a portion thereof is reflected by a reflection means to be emitted forward from the light guide member. Further, a portion of the light is reflected by the luminance distribution control or adjusting means to adjust the entire luminance distribution of light emitted in a direction forward from the light guide member.

In the illumination device, the luminance distribution-adjusting means may preferably be disposed in varying distribution densities, e.g., between the light guide means and the reflection means, so that the amount of light reflected on the side of the reflection means of the light guide means and emitted in a forward direction from the light guide means is larger in a region of a higher distribution density and smaller in a region of a lower distribution density, respectively of the luminance distribution adjusting means.

In this case, it is preferred that the luminance distribution-adjusting means is disposed between the plural linear light sources in a distribution density such that the distribution density is lowest in the vicinity of the linear light sources and becomes higher at a position leaving away from the linear light sources, and the distribution density changes without angular deflection at a point remotest from the plural linear light sources. In the present invention, it is preferred that the linear light sources are disposed in a total number of four so as to surround the light guide means. In this case, it is preferred that the luminance distribution adjusting means is disposed in a distribution density such that it is highest in the vicinity of a central portion of the light guide means and decreases as a position approaches the edges of the light guide means to provide an iso-distribution density curve forming a closed loop free from an angle. Further in this case, it is preferred that the iso-distribution density curve is substantially similar in shape with a contour of an effective light-emission face of the light guide means but is angle-free. It is also preferred that the light guide means has an effective light-emission face in shape of a rectangle having a longer side and a shorter side, and said iso-distribution density curve provides a longer axis and a shorter axis in a ratio which is identical to that between the longer side and the shorter side of the rectangle. It is possible that the luminance distribution adjusting means is disposed in a distribution density which is increased at a corner of the light guide means.

On the other hand, in the present invention, it is also possible that the luminance distribution adjusting means is disposed on a fore side of the light guide means and opposite the reflection means in varying distribution densities so that the amount of light emitted in a forward direction from the light guide means is smaller in a region of a higher distribution density and larger in a region of a lower distribution density, respectively of the luminance distribution adjusting means.

In this case, it is preferred that the luminance distribution adjusting means is disposed between the plural linear light sources in a distribution density such that the distribution density is highest in the vicinity of the linear light sources and becomes lower at a position leaving away from the linear light sources, and the distribution density changes without angular deflection at a point remotest from the plural linear light sources. Also in this case, it is preferred that the linear light sources are disposed in a total number of four so as to surround the light guide means. In this case, it is preferred that the luminance distribution adjusting means is disposed in a distribution density such that it is lowest in the vicinity of a central portion of the light guide means and increases as a position approaches the edges of the light guide means to provide an iso-distribution density curve forming a closed loop free from an angle. Further, in this case, it is preferred that the iso-distribution density curve is substantially similar in shape with a contour of an effective light-emission face of the light guide means but is angle-free. It is also preferred that the light guide means has an effective light-emission face in shape of a rectangle having a longer side and a shorter side, and said iso-distribution density curve provides a longer axis and a shorter axis in a ratio which is identical to that between the longer side and the shorter side of the rectangle. In this case, it is possible that the luminance distribution adjusting means is disposed in a distribution density which is decreased at a corner of the light guide means.

In the present invention, the above-mentioned luminance distribution adjusting means may preferably be constituted as a reflection pattern comprising a large number of dots causing random reflection of light incident thereto from the linear light source. Alternatively, the luminance distribution adjusting means may be constituted as a mesh pattern causing random reflection of light incident thereto from the linear light source. The light guide means may be provided as a transparent sheet member of, e.g., an acrylic resin plate. Alternatively, the light guide means may be provided as a space formed between or among the plurality of linear light sources.

Hereinbelow, some preferred embodiments of the present invention will be described more specifically with reference to the drawings.

(First Embodiment)

A first embodiment of the present invention will now be described with reference to FIGS. 8–10.

Figure 1:
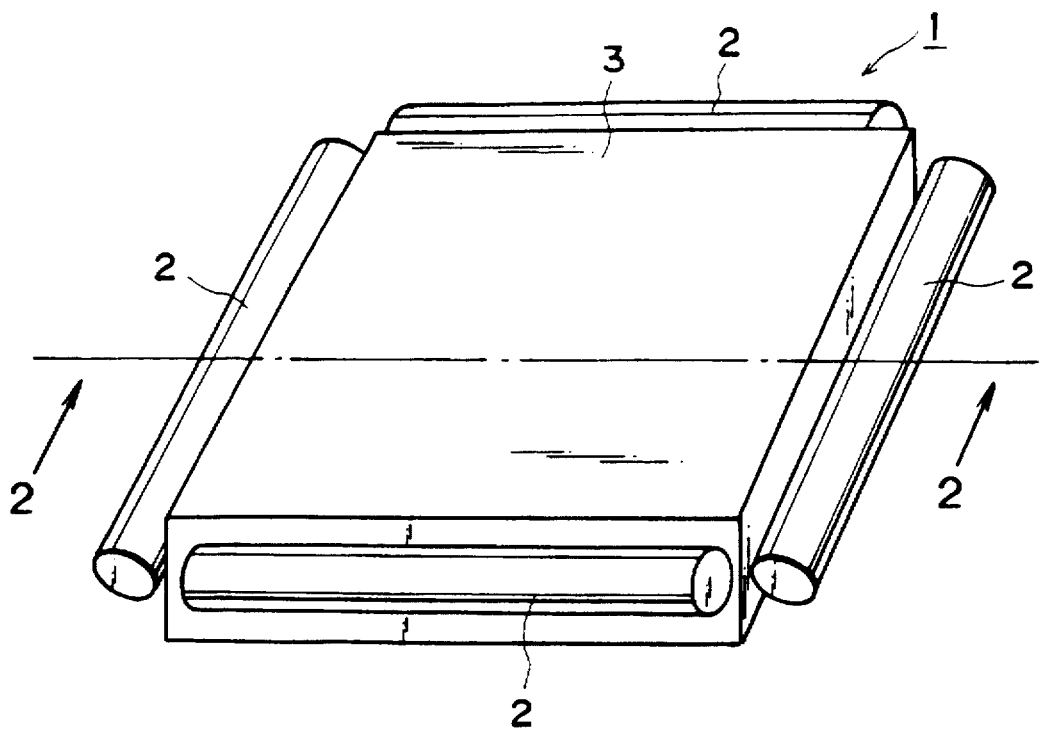
FIG. 1 is a schematic perspective view illustrating a structural outline of an illumination device.
Figure 2:
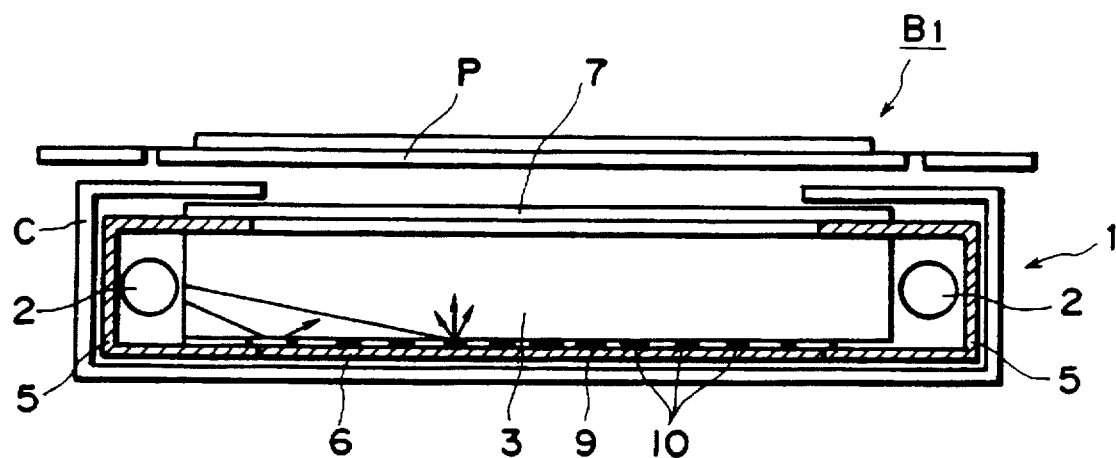
FIG. 2 is a sectional view of a liquid crystal display apparatus including a section taken along line 2—2 in FIG. 1.
Figure 3:
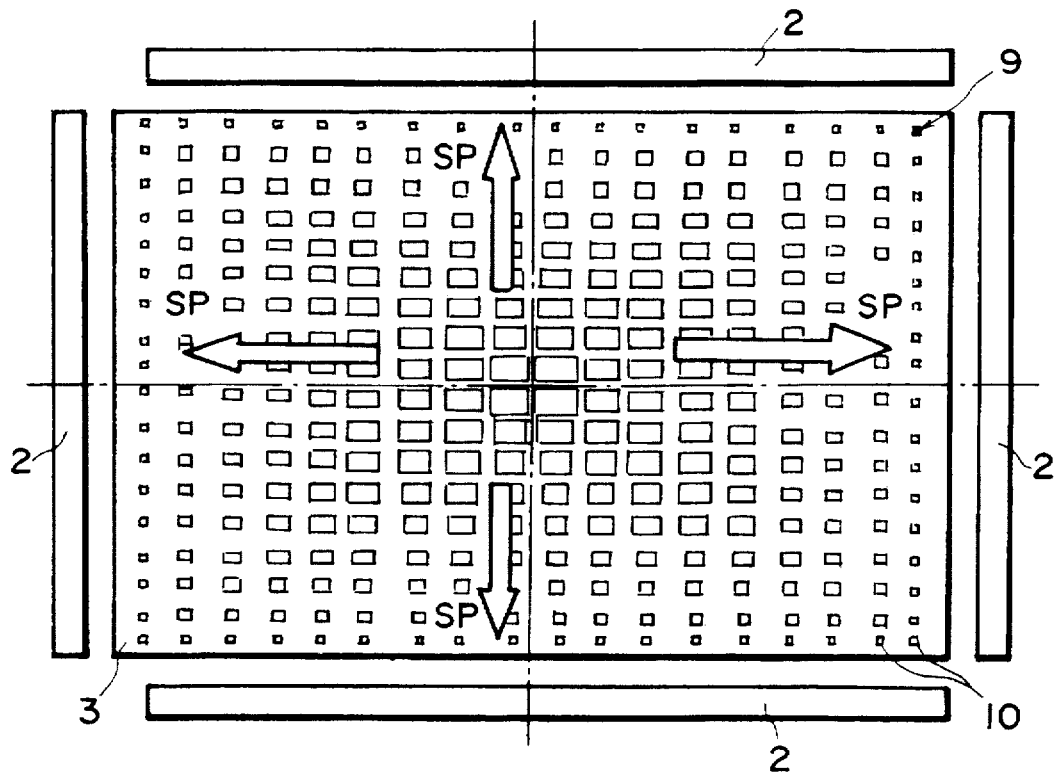
FIG. 3 is an illustration of an arrangement of diffusive reflection pattern dots in an illumination device.
Figure 4:
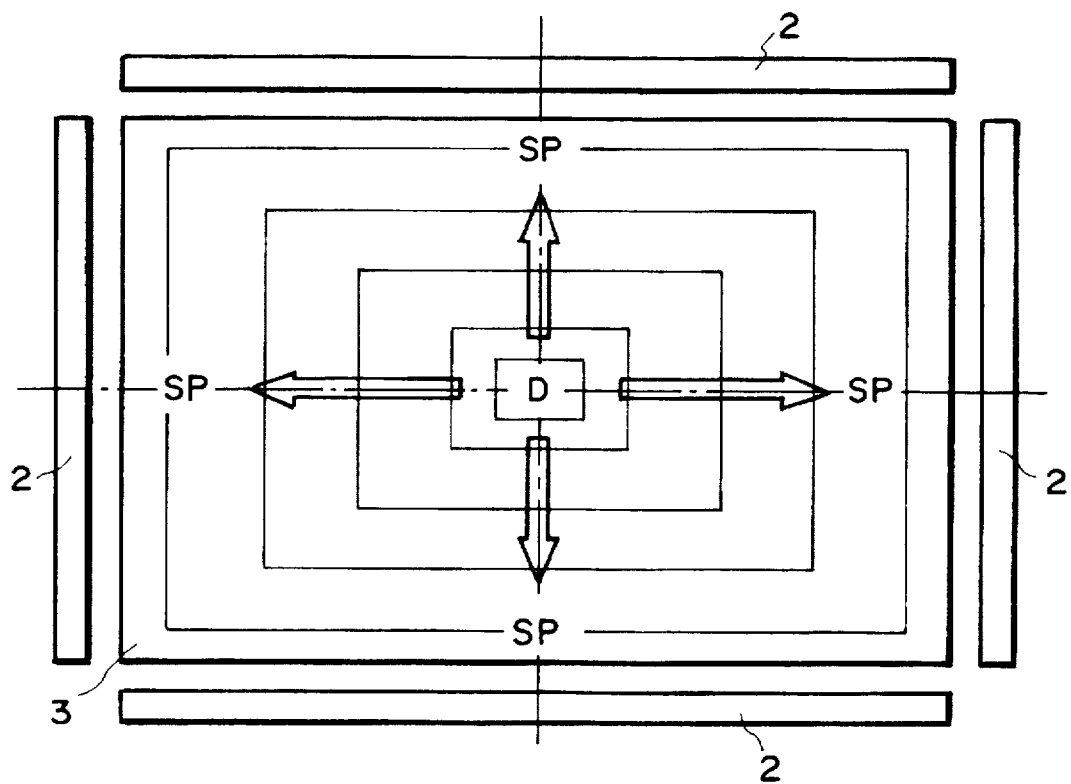
FIGS. 4 and 5 are respectively an illustration including iso-distribution density curves in an illumination device before the invention.
Figure 5:
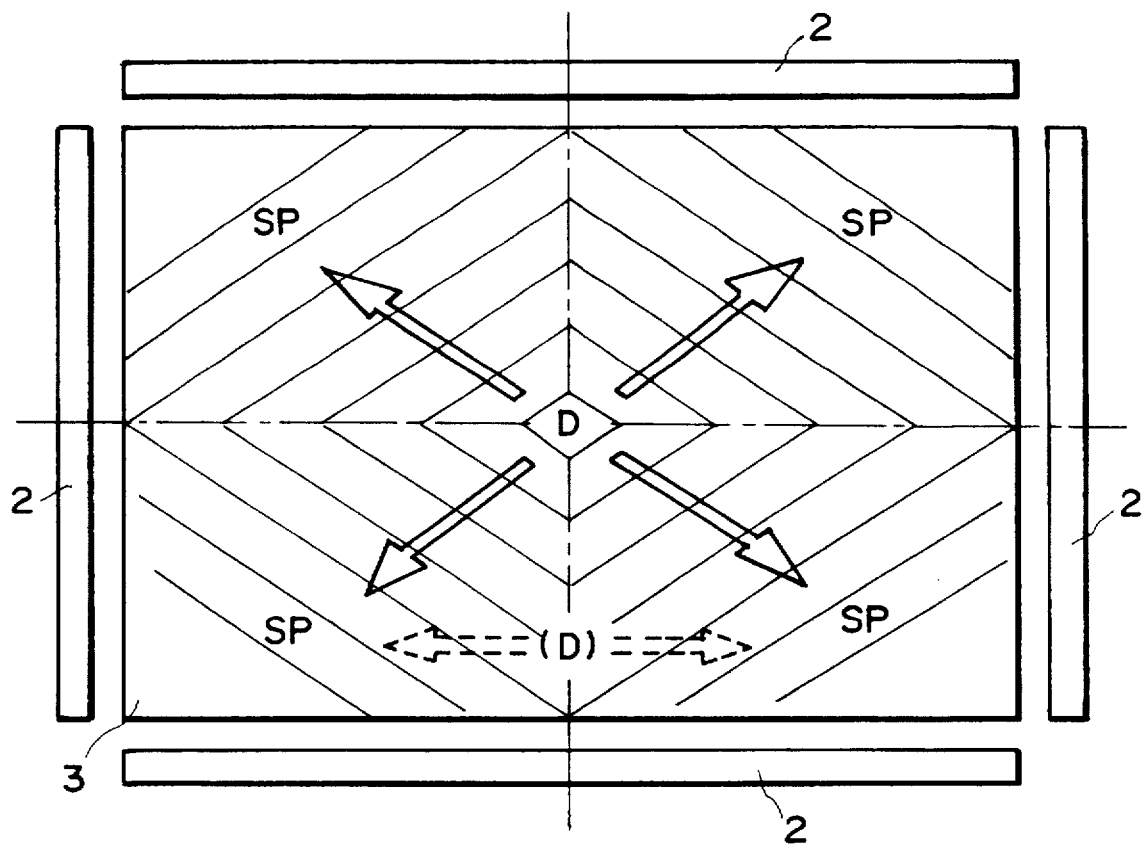
Figure 6:
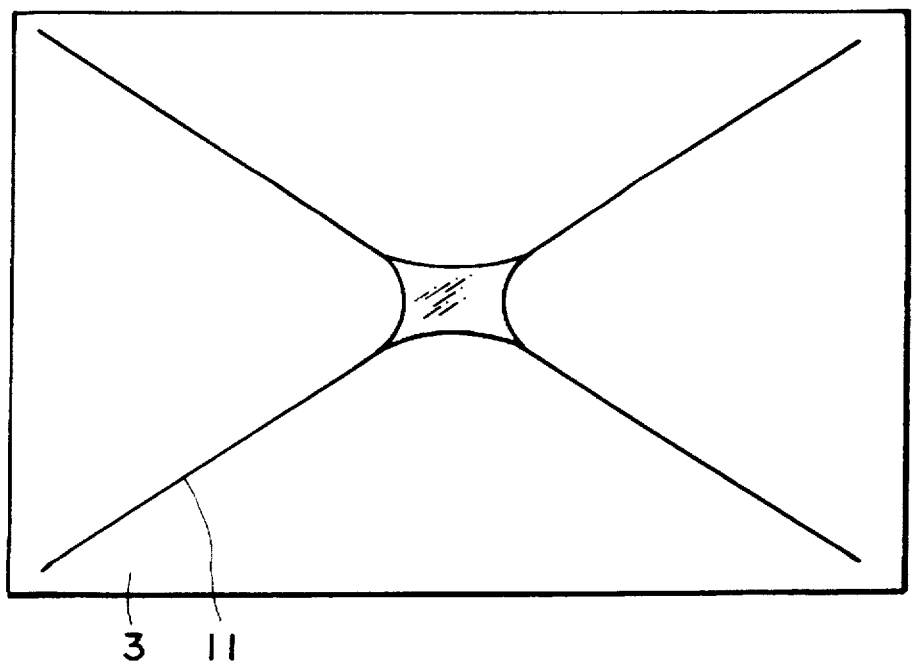
FIGS. 6 and 7 are illustrations of state of occurrence of bright lines in the illumination devices having diffusive reflection dot distributions shown in FIGS. 4 and 5, respectively.
Figure 7:
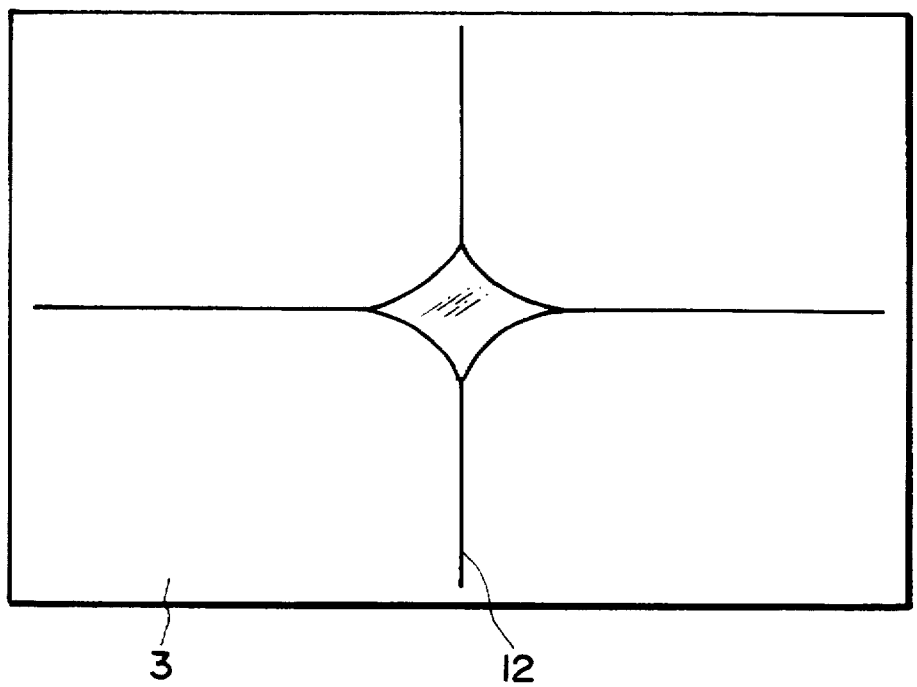

An illumination device (backlight device) according to this embodiment has an outer appearance similar to that shown in FIGS. 1 and 2 including a rectangular light guide means 3 and mutually oppositely disposed four fluorescent lamps 2 each disposed along one of the four sides of the rectangular light guide means 3. However, distribution density of the diffusive reflection pattern 9 taken along a section including a line A—A in FIG. 1 is as shown in FIGS. 8 (solid line) and 9. More specifically, the distribution density of the diffusive reflection pattern 9 along a section including mutually oppositely disposed fluorescent lamps 2 and passing through a center of the illumination device is represented by a solid line in FIG. 8 and is set to be the lowest at the parts in the vicinities of the fluorescent lamps 2 and to be higher as the position leaves away from the fluorescent lamps 2. Further, the distribution density is designed to continuously vary gently along a smooth curve (i.e., not to provide a discontinuity in change rate of the distribution density) at a central part of the illumination device. Further, the areal distribution density of the diffusive reflection pattern along an illumination surface of the acrylic plate 3 (light guide means) is designed to be the highest in the vicinity of the center of the acrylic plate 3 and lower at positions closer to the periphery or edges of the acrylic plate 3. Each iso-distribution density curve forms an angle-free closed loop, preferably an angle-free closed loop which is almost similar in shape to the outer contour of an effective emission surface of the acrylic plate 3 (a rectangle in this embodiment). More specifically, the iso-distribution density curve is designed to draw a closed loop having a long axis/short axis ratio substantially equal to a long side/short side ratio of the effective emission surface. Herein, the term "effective emission surface" refers to a surface of a light guide member (acrylic plate) 3 from which light is emitted toward the liquid crystal panel P.

According to this embodiment, the occurrence of bright lines on an illumination surface of an illumination device (backlight device) is suppressed to provide a uniform planar luminance distribution, thereby providing the liquid crystal panel with good display qualities. FIG. 10 shows a luminance distribution represented by iso-luminance curves (loops) based on a measured luminance distribution of a backlight device. FIG. 10 shows that the luminance does not change remarkably anywhere on the emission surface but provides a substantially continuous luminance-changing rate and moderate luminance distribution.

(Second Embodiment)

Figure 11:
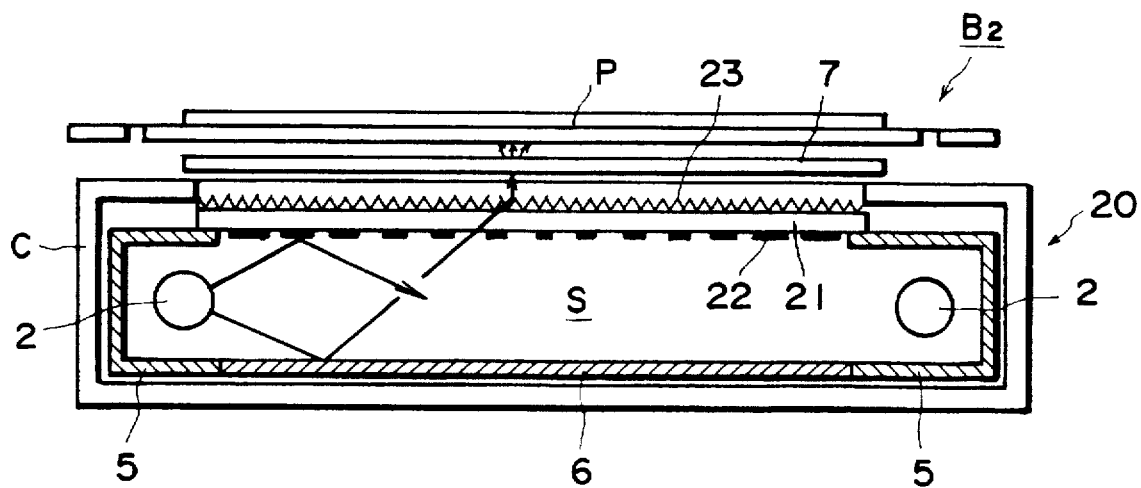
FIG. 11 is a sectional view of a liquid crystal display apparatus according to a second embodiment of the invention.
Figure 12:
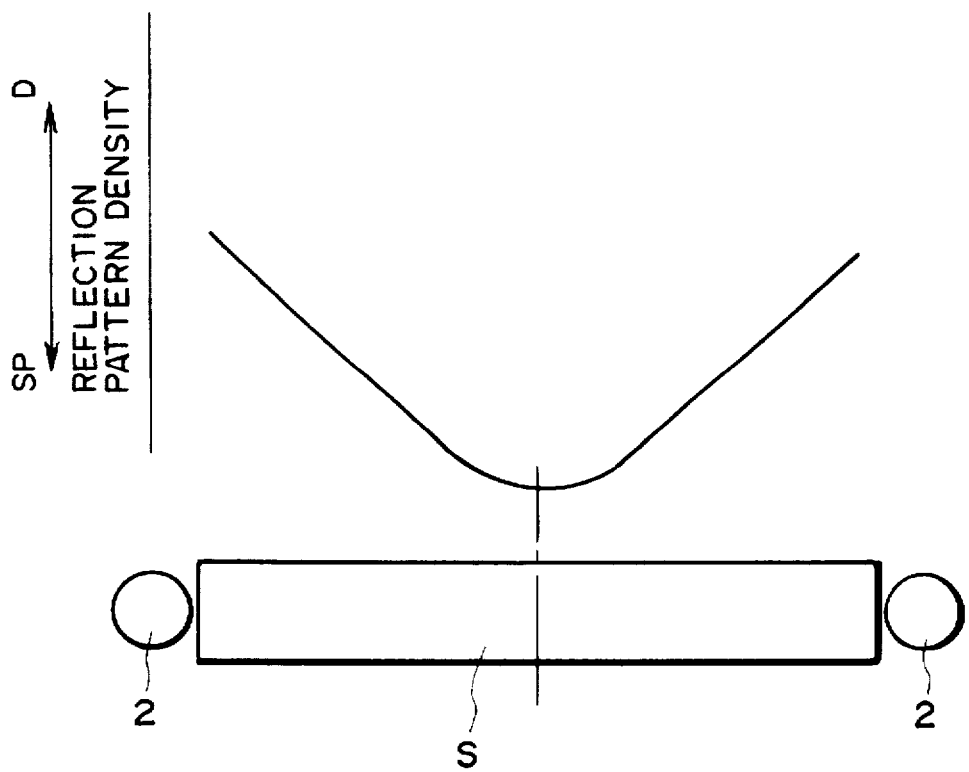
FIG. 12 illustrates a diffusive reflection pattern distribution density along a transverse section between two opposite fluorescent lamps according to another embodiment.

Now, a second embodiment of the present invention will be described with reference to FIGS. 11 and 12, wherein identical members are denoted by identical numerals as in FIG. 2 and detailed explanation thereof may be omitted.

Figure 13:
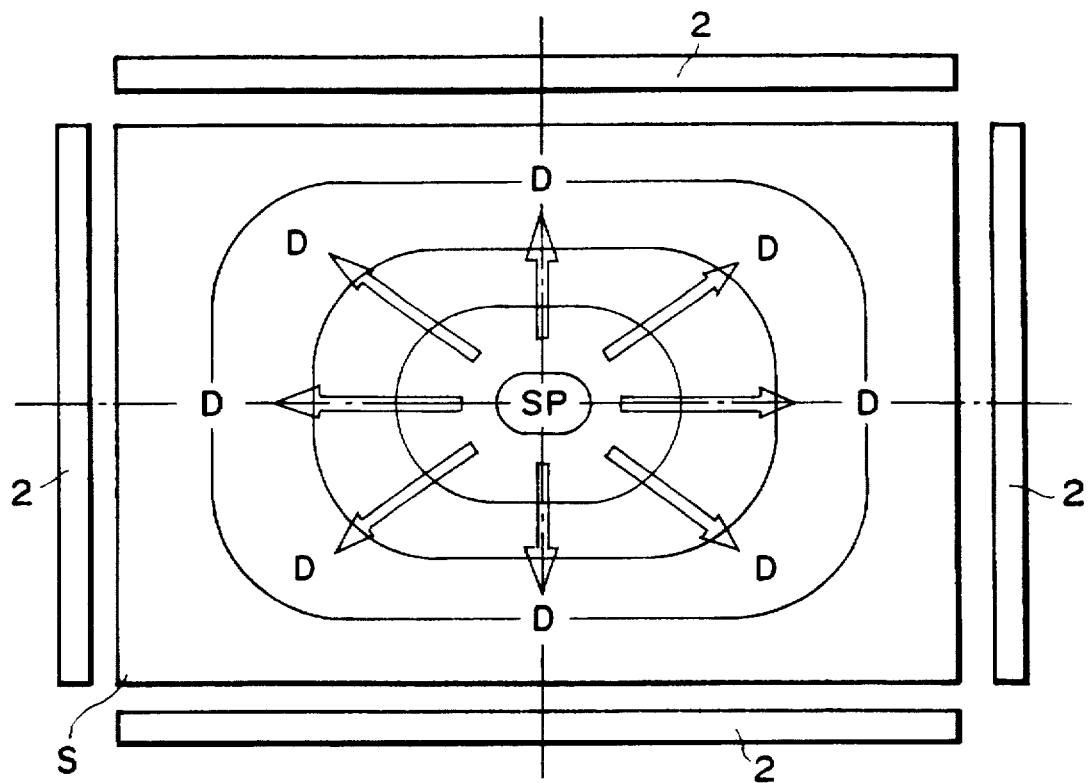
FIG. 13 is an illustration of a planar distribution density of a diffusive reflection pattern according to a second embodiment of the present invention.

An illumination device 20 according to this embodiment is provided with a front or fore-side transmission plate 21 disposed in parallel with a rear reflection plate (reflection means) 6 and a space S formed as a light guide means between the rear reflection plate 6 and the front transmission plate 21. The front transmission plate 2 is formed of a thin transparent acrylic resin plate, below which is disposed a reflection pattern (luminance distribution adjusting means) 22. In other words, the reflection pattern 22 is disposed on a fore-side of the light guide means (space S) so as to be opposite to the rear reflection plate 6. The reflection pattern 22 may for example be formed by vapor deposition of aluminum in the form of a mesh or dots in a distribution density such that a smaller amount of light is emitted in a fore direction toward the liquid crystal panel P at a position of a higher distribution density and a larger amount of the light is emitted at a position of a lower distribution density. The distribution density of the reflection pattern 22 is designed to be as shown in FIGS. 12 and 13. More specifically, the distribution density of the reflection pattern 22 along a section including fluorescent lamps 2 and a center of the illumination device 20 is set to be the highest in the vicinities of the fluorescent lamps 2 and to be lower as the position leaves away from the fluorescent lamps 2. Further, the distribution density is designed to continuously vary gently along a smooth curve (i.e., not to provide a discontinuity in change rate of the distribution density) at a central part of the illumination device. Further, the areal distribution density of the reflection pattern 22 is designed to be the lowest in the vicinity of the center of the light guide space S and higher at positions closer to the fluorescent lamps 2. Each iso-distribution density curve forms an angle-free closed loop, preferably an angle-free closed loop which is almost similar in shape to the outer contour of an effective emission surface of the transmission plate 21 (a rectangle in this embodiment). More specifically, the iso-distribution density curve is designed to draw a closed loop having a long axis/short axis ratio substantially equal to a long side/short side ratio of the effective emission surface.

On the other hand, on a fore-side (upper side) of the front transmission plate 21, a prism sheet 23 is disposed so as to uniformize the directionality of illumination light. On the prism sheet 23, respective prisms are disposed so that the extension direction of each prism ridge is parallel with the longitudinally extending directions of the fluorescent lamps 2. (In case of using 4 fluorescent lamps, another prism sheet may preferably be disposed in superposition so that its prism ridge extension direction is in parallel with the longitudinal extension direction of the other pair of fluorescent lamps.) Further, the respective prisms are so disposed that their apex angles are directed toward the front transmission plate 21.

In this embodiment, a liquid crystal display apparatus $B_2$ is constituted by the above-mentioned backlight device 20 and the liquid crystal panel P.

According to this embodiment, the occurrence of bright lines on an illumination surface of an illumination device (backlight device) is suppressed to provide a uniform planar luminance distribution, thereby providing the liquid crystal panel with good display qualities.

Figure 9:
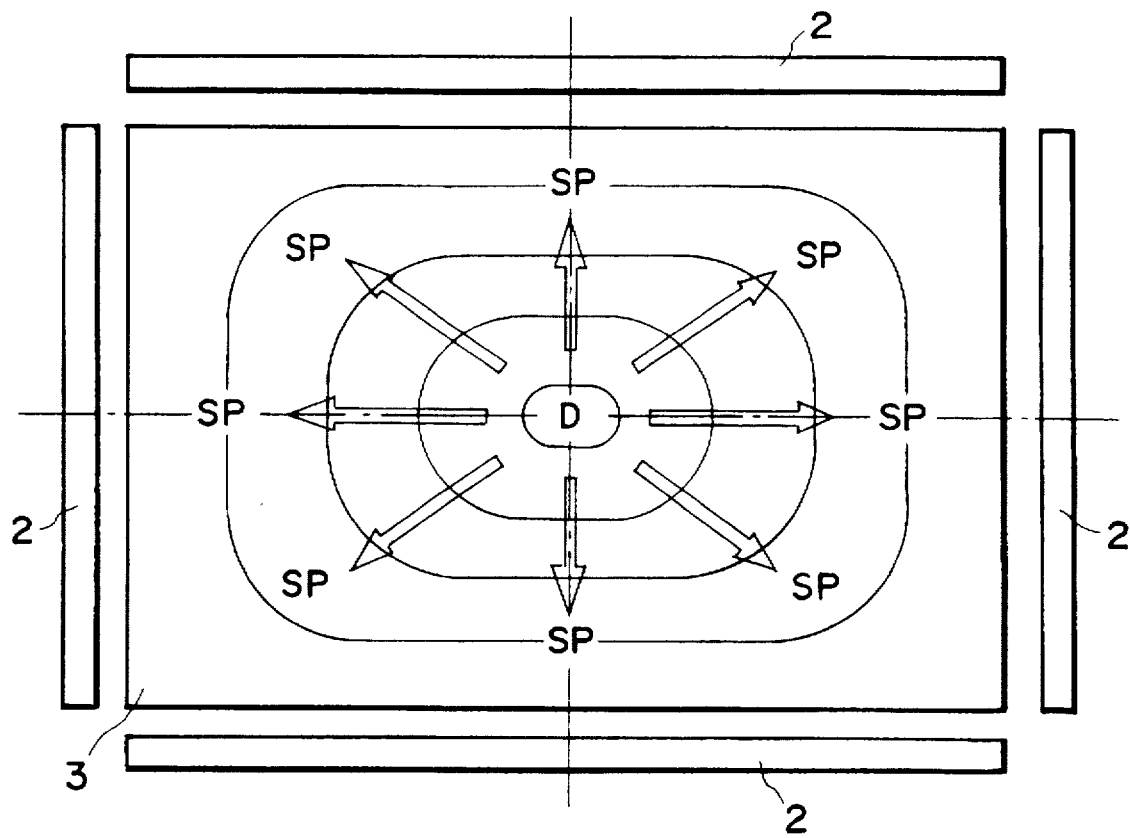
FIG. 9 is an illustration of a planar distribution density of a diffusive reflection pattern according to an embodiment of the present invention.
Figure 10:
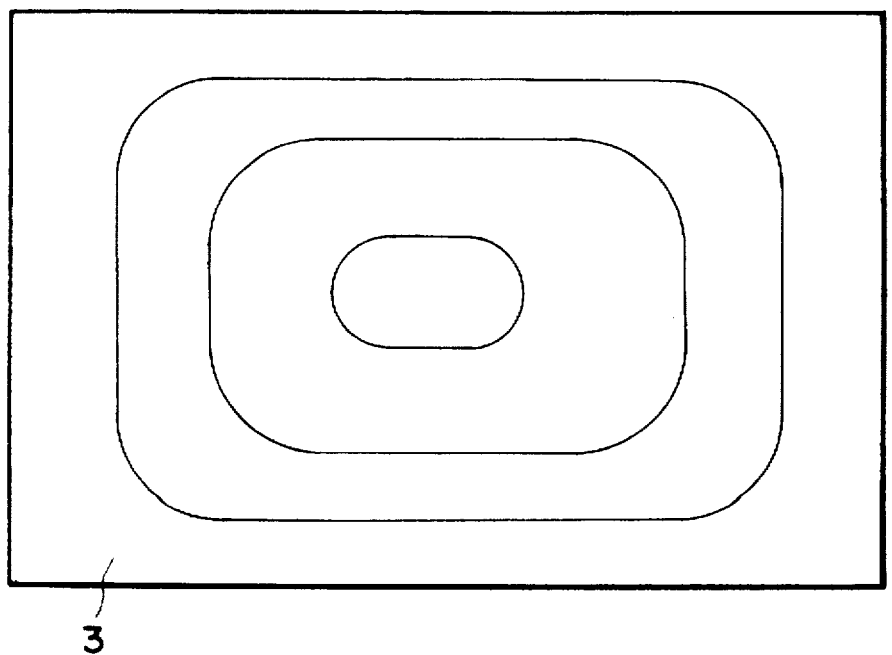
FIG. 10 is an illustration of a luminance distribution given as an effect of the invention.
Figure 14:
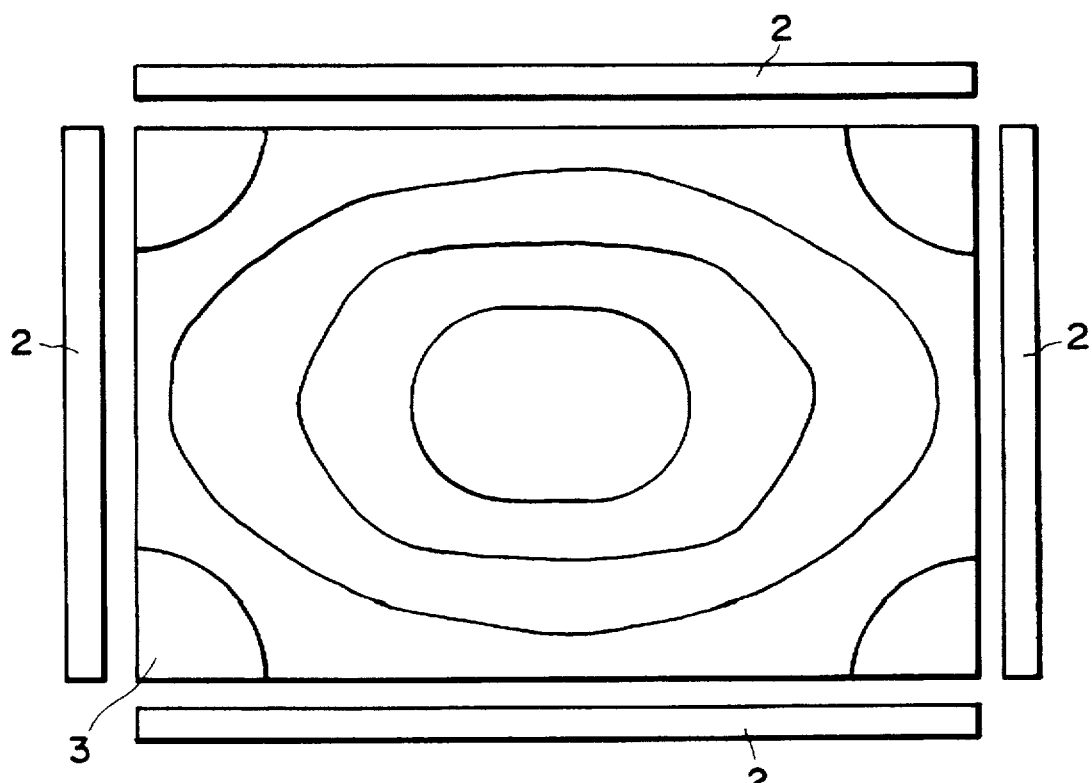
FIG. 14 is an illustration of a luminance distribution given as an effect of another embodiment of the invention.

As described above, the diffusive reflection pattern 9 is disposed in a distribution density as shown in FIG. 9 in the first embodiment, and the reflection pattern 22 is disposed in a distribution density as shown in FIG. 13. However, they are not limitative. For example, in case where the light guide means (acrylic plate 3 or light guide space S) provides four corner portions where the luminance is lowered, it is possible to provide a higher distribution density of the diffusive reflection pattern 9 than the surrounding regions in the first embodiment, or it is possible to provide a lower distribution density of the reflection pattern 22 than the surrounding regions, thereby increasing the luminance of light emitted from such corner regions to moderate and substantially uniformize the luminance distribution over the entire illumination surface (as shown in FIG. 14). On the other hand, in case where there is a locally excessive luminance portion, it is possible to lower the distribution density of the diffusive reflection pattern 9 in the first embodiment or it is possible to increase the distribution density of the reflection pattern 22 in the second embodiment, respectively than in the surrounding region, thereby uniformizing the luminance distribution over the entire surface. Such an adjustment of the distribution density may be performed depending on the type (characteristic) and disposition of the light source used.

In the above-embodiments, the (diffusive) reflection pattern has been generally described to be formed in a dot pattern but may also be formed in a mesh pattern.

Further, the light guide means has been described as an acrylic plate 3 in the first embodiment and a light guide space S in the second embodiment but it is also possible to use a light guide space in the first embodiment and a transparent sheet member such as an acrylic plate in the second embodiment.

As described above, according to the present invention, it becomes possible to prevent the occurrence of bright lines on a planar illumination device to uniformize the luminance distribution.

Further, according to the present invention, by using such an illumination device having a uniformized luminance distribution as a backlight device of a liquid crystal panel, it becomes possible to improve the display qualities of the liquid crystal panel.

What is claimed is:

1. An illumination device, comprising:

a rectangular light guide means, four linear light sources disposed along four sides of the rectangular light guide means so as to surround the light guide means, a reflection means disposed behind the light guide means so that light issued from the linear light sources is transmitted through the light guide means and reflected by the reflection means to be emitted from the light guide means in a forward direction, and a luminance distribution-adjusting means for reflecting light transmitted through the light guide means and disposed along the light guide means with a distribution density which varies continuously at a changing rate free from discontinuity so as to adjust the luminance distribution of the light emitted from the light guide means in a forward direction and so as to emit a substantially uniform distribution of light from the light guide means, wherein said luminance distribution-adjusting means is disposed between the light guide means and the reflection means with a distribution density that is highest in the vicinity of a central portion of the light guide means and decreases as a position approaches the edges of the light guide means to provide an iso-distribution density curve forming a closed loop with no angles.

2. An illumination device according to claim 1, wherein said luminance distribution adjusting means is disposed between the linear light sources with a distribution density such that the distribution density is lowest in the vicinity of the linear light sources and becomes higher at a position further from the linear light sources, and the distribution density changes without angular deflection at a point furthest from the linear light sources.

3. An illumination device according to claim 1, wherein said iso-distribution density curve is substantially similar in shape with a contour of an effective light-emission face of the light guide means.

4. An illumination device according to claim 1, wherein said light guide means has an effective light-emission face in the shape of a rectangle having a longer side and a shorter side, and said iso-distribution density curve provides a longer axis and a shorter axis in a ratio which is identical to that between the longer side and the shorter side of the rectangle.

5. An illumination device according to claim 1, wherein said luminance distribution adjusting means comprises a plurality of dots reflecting light from the linear light sources.

6. An illumination device according to claim 1, wherein said luminance distribution adjusting means is a mesh reflecting light from the linear light sources.

7. An illumination device according to claim 1, wherein said light guide means comprises an acrylic resin plate.

8. An illumination device according to claim 1, wherein said light guide means comprises a space formed between or among said linear light sources.

9. An illumination device, comprising:

a rectangular light guide means;

four linear sources disposed along four sides of the rectangular light guide means so as to surround the light guide means;

a reflection means disposed behind the light guide means so that light issued from the linear light sources is transmitted through the light guide means and reflected by the reflection means to be emitted from the light guide means in a forward direction; and a luminance distribution-adjusting means for reflecting light transmitted through the light guide means and disposed along the light guide means with a distribution density which varies continuously at a changing rate free from discontinuity so as to adjust the luminance distribution of the light emitted from the light guide means in a forward direction and so as to emit a substantially uniform distribution of light from the light guide means, wherein said luminance distribution-adjusting means is disposed on a front side of the light guide means and opposite the reflection means with a distribution density that is lowest in the vicinity of a central portion of the light guide means and increases as a position approaches the edges of the light guide means to provide an iso-distribution density curve forming a closed loop with no angles.

10. An illumination device according to claim 9, wherein said luminance distribution adjusting means is disposed between the linear light sources with a distribution density such that the distribution density is highest in the vicinity of the linear light sources and becomes lower at a position further from the linear light sources, and the distribution density changes without angular deflection at a point furthest from the linear light sources.

11. An illumination device according to claim 9, wherein said iso-distribution density curve is substantially similar in shape with a contour of an effective light-emission face of the light guide means.

12. An illumination device according to claim 9, wherein said light guide means has an effective light-emission face in the shape of a rectangle having a longer side and a shorter side, and said iso-distribution density curve provides a longer axis and a shorter axis in a ratio which is identical to that between the longer side and the shorter side of the rectangle.

13. An illumination device, comprising:

a light guide member comprising an almost rectangular transparent sheet material having four sides, four linear light sources each disposed along one of the four sides of the light guide member, a reflection plate disposed on a rear side of the light guide member, and a reflection pattern disposed between the light guide member and the reflection plate comprising a plurality of dots disposed in a varying distribution density such that the distribution density is low in the vicinity of the linear light sources and increases as it becomes further from the linear light sources, the distribution density assuming a maximum without providing a discontinuity in a distribution density-varying rate along a horizontal line extending between a pair of opposite linear light sources, the distribution density providing an iso-distribution density curve on a rear face of the light guide member which forms an angle-free closed loop having a shape substantially similar to the contour of the light-emission face of the light guide member, whereby light issued from the linear light sources is transmitted through the light guide member and reflected by the reflection plate and the reflection pattern to be emitted from the light guide member in a forward direction.

14. An illumination device, comprising:

a light guide member comprising an almost rectangular transparent sheet material having four sides, four linear light sources each disposed along one of the four sides of the light guide member, a reflection plate disposed on a rear side of the light guide member, and a reflection pattern disposed on a front side of the light guide member comprising a plurality of dots disposed in a varying distribution density such that the distribution density is high in the vicinity of the linear light sources and decreases as it becomes further from the linear light sources, the distribution density assuming a minimum without providing a discontinuity in a distribution density-varying rate along a horizontal line extending between a pair of opposite linear light sources, the distribution density providing an iso-distribution density curve on a light-emission face of the light guide member which forms an angle-free closed loop having a shape substantially similar to the contour of the light-emission face of the light guide member, whereby light issued from the linear light sources is transmitted through the light guide member and reflected by the reflection plate and the reflection pattern to be emitted from the light guide member in a forward direction.

15. An illumination device, comprising:

a rectangular light guide means, four linear light sources disposed along four sides of the rectangular light guide means so as to surround the light guide means, a reflection means disposed behind the light guide means so that light issued from the linear light sources is transmitted through the light guide means and reflected by the reflection means to be emitted from the light guide means in a forward direction, and a luminance distribution-adjusting means for reflecting light transmitted through the light guide means and disposed along the light guide means with a distribution density which varies continuously at a changing rate free from discontinuity so as to adjust the luminance distribution of the light emitted from the light guide means in a forward direction and so as to emit a substantially uniform distribution of light from the light guide means, wherein said luminance distribution-adjusting means is disposed the light guide means and the reflection means with a distribution density that is highest in the vicinity of a central portion of the light guide means and decreases as a position approaches the edges of the light guide means, except at a corner of the light guide means wherein the distribution density increases, to provide an iso-distribution density curve forming a closed loop with no angles.

16. An illumination device, comprising:

a rectangular light guide means, four linear light sources disposed along four sides of the rectangular light guide means so as to surround the light guide means, a reflection means disposed behind the light guide means so that light issued from the linear light sources is transmitted through the light guide means and reflected by the reflection means to be emitted from the light guide means in a forward direction, and a luminance distribution-adjusting means for reflecting light transmitted through the light guide means and disposed along the light guide means with a distribution density which varies continuously at a changing rate free from discontinuity so as to adjust the luminance distribution of the light emitted from the light guide means in a forward direction and so as to emit a substantially uniform distribution of light from the light guide means, wherein said luminance distribution-adjusting means is disposed on a front side of the light guide means and opposite the reflection means with a distribution density that is lowest in the vicinity of a central portion of the light guide means and increases as a position approaches the edges of the light guide means, except at a corner of the light guide means wherein the distribution density decreases, to provide an iso-distribution density curve forming a closed loop with no angles.

17. A liquid crystal display apparatus, comprising:

an illumination device according to any of claims 1–16, and a liquid crystal panel disposed on a front side of the illumination device to be illuminated by the illumination device.

* * * * *